(12) United States Patent
Becker (10) Patent No.: US 9,160,738 B2
(45) Date of Patent: Oct. 13, 2015

(54) DELEGATION-BASED AUTHORIZATION (75) Inventor: Moritz Becker, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 841 days.

(21) Appl. No.: 12/789,277

(22) Filed: May 27, 2010

(65) Prior Publication Data

US 2011/0296497 A1    Dec. 1, 2011

(51) Int. Cl.
H04L 29/06 (2006.01)
(52) U.S. Cl.
CPC ......... H04L 63/0807 (2013.01); H04L 63/1408 (2013.01)
(58) Field of Classification Search
CPC ....... G06F 21/33; G06F 21/64; G06F 21/335; H04L 63/0807
USPC .......................................................... 726/4
See application file for complete search history.

(56) References Cited

U.S. PATENT DOCUMENTS

| | | | |
|---|---|---|---|
| 6,367,009 B1 | 4/2002 | Davis et al. | |
| 6,601,171 B1 | 7/2003 | Carter et al. | |
| 6,643,774 B1 | 11/2003 | McGarvey | |
| 2007/0277231 A1 | 11/2007 | Medvinsky et al. | |
| 2008/0066147 A1 | 3/2008 | Dillaway et al. | |
| 2008/0066159 A1* | 3/2008 | Dillaway et al. | 726/4 |
| 2009/0119672 A1* | 5/2009 | Bussard et al. | 718/104 |
| 2011/0016507 A1* | 1/2011 | Becker | 726/1 |

OTHER PUBLICATIONS

Gurevich et al. (Operational Semantics for DKAL: Application and Analysis, LNCS 5695, pp. 149-155, 2009).*
Abadi, et al., "A Calculus for Access Control in Distributed Systems", retrieved on Apr. 6, 2009 at <<http://www.hpl.hp.com/techreports/Compaq-DEC/SRC-RR-70.pdf>>, Springer-Verlag London, Lecture Notes in Computer Science vol. 576, Proceedings of International Cryptology Conference on Advances in Cryptology, 1991, pp. 1-23.

(Continued)

Primary Examiner — Peter Shaw
(74) Attorney, Agent, or Firm — Steve Wight; Judy Yee; Micky Minhas (57) ABSTRACT

Delegation-based authorization is described. In one example, a reference monitor receives from a first entity a request and a credential statement comprising a delegation of authority over a fact to a further entity. An authorization node then determines whether the further entity consents to provide the fact to the first entity and evaluates the request in accordance with an authorization policy and the credential statement. In another example, an assertion comprising a statement delegating authority over a fact to a further entity is received at an authorization node from a first entity. An authorization policy is then used to determine that the first entity vouches for the fact if each of these conditions are met: i) the first entity consents to import the fact from the further entity, ii) the further entity consents to export the fact to the first entity, and iii) the further entity asserts the fact.

20 Claims, 4 Drawing Sheets

(56) References Cited

OTHER PUBLICATIONS

Anderson, "OASIS eXtensible Access Control Markup Language (XACML)", retrieved on Apr. 6, 2009 at <<http://research.sun.com/projects/xacml/XMLCOP_060620_slides.pdf>>, Sun Microsystems presentation, XML Community of Practice, Jun. 2006, pp. 1-48.

Becker, et al., "Abductive Authorization Credential Gathering", IEEE International Symposium on Policies for Distributed Systems and Networks (Policy), Jul. 2009, pp. 1-8.

Becker, et al., "Cassandra: Distributed Access Control Policies with Tunable Expressiveness", retrieved on Apr. 6, 2009 at <<http://citeseerx.ist.psu.edu/viewdoc/download?doi=10.1.1.64.6693&rep=rep1&type=pdf>>, IEEE International Workshop on Policies for Distributed Systems and Networks (Policy), Jun. 2004, pp. 1-10.

Becker, et al., "Cassandra: Flexible Trust Management, Applied to Electronic Health Records", retrieved on Apr. 6, 2009 at <<http://citeseerx.ist.psu.edu/viewdoc/download?doi=10.1.1.4.889&rep=rep1&type=pdf>>, IEEE Computer Security Foundations Workshop (CSFW), 2004, pp. 1-16.

Becker, et al., "Design and Semantics of a Decentralized Authorization Language", retrieved on Apr. 6, 2009 at <<http://research.microsoft.com/pubs/76076/BeckerFournetGordon_AuthorizationLanguage.pdf>>, IEEE Computer Society, Proceedings of Computer Security Foundations Symposium (CSF), 2007, pp. 3-15.

Becker, et al., "SecPAL: Design and Semantics of a Decentralized Authorization Language", retrieved on Apr. 6, 2009 at <<http://research.microsoft.com/pubs/70334/tr-2006-120.pdf>>, Microsoft Research, Microsoft Corporation, Technical Report MSR-TR-2006-120, Sep. 2006, pp. 1-38.

Becker, "SecPAL: Formalization and Extensions", retrieved on Apr. 6, 2009 at <<http://research.microsoft.com/pubs/102613/SecPAL%20formalization%20and%20extensions%202009-09-21%20rev%2002.pdf>>, Microsoft Research, Microsoft Corporation, Technical Report MSR-TR-2009-127, Sep. 2009, pp. 1-10.

Becker, et al., "The Role of Abduction in Declarative Authorization Policies", retrieved on Apr. 6, 2009 at <<http://citeseerx.ist.psu.edu/viewdoc/download?doi=10.1.1.87.9260&rep=rep1&type=pdf>>, Proceedings of International Symposium on Practical Aspects of Declarative Languages (PADL), 2008, pp. 1-17.

Blaze, et al., "The Role of Trust Management in Distributed Systems Security", retrieved on Apr. 6, 2009 at <<http://www.crypto.com/papers/trustmgt.pdf>>, Springer-Verlag, Secure Internet Programming: Security Issues for Mobile and Distributed Objects, 1999, pp. 185-210.

Bonatti, et al., "Foundations of Secure Deductive Databases", retrieved on Apr. 6, 2009 at <<http://citeseerx.ist.psu.edu/viewdoc/download?doi=10.1.1.129.2559&rep=rep1&type=pdf>>, IEEE Transactions on Knowledge and Data Engineering, vol. 7, No. 3, Jun. 1995, pp. 406-422.

Bryans, et al., "Opacity Generalised to Transition Systems", retrieved on Apr. 6, 2009 at <<http://www.cs.ncl.ac.uk/publications/trs/papers/868.pdf>>, University of Newcastle upon Tyne, Technical Report Series CS-TR-868, 2004, pp. 1-32.

Ceri, et al., "What You Always Wanted to Know About Datalog (and Never Dared to Ask)", IEEE Transactions on Knowledge and Data Engineering, vol. 1, No. 1, Mar. 1989. pp. 146-166.

Clarke, "SPKI/SDSI HTTP Server / Certificate Chain Discovery in SPKI/SDSI", retrieved on Apr. 6, 2009 at <<http://groups.csail.mit.edu/cis/theses/clarke-masters.pdf>>, Massachusetts Institute of Technology, Masters Thesis, Sep. 2001, pp. 1-160.

Cosmadakis, et al., "Decidable Optimization Problems for Database Logic Programs", retrieved on Apr. 6, 2009 at <<http://portal.acm.org/ft_gateway.cfm?id=62259&type=pdf&coll=GUIDE&dl=GUIDE&CFID=83241397&CFTOKEN=46750633>>, ACM, Proceedings of Symposium on Theory of Computing, 1988, pp. 477-490.

Denning, "A Lattice Model of Secure Information Flow", retrieved on Apr. 6, 2009 at <<http://portal.acm.org/ft_gateway.cfm?id=360056&type=pdf&coll=GUIDE&dl=GUIDE&CFID=83241497&CFTOKEN=87148930>>, ACM, Symposium on Operating Systems Principles, The University of Texas at Austin, Nov. 1975, pp. 236-243.

DeTreville, "Binder, a Logic-Based Security Language", retrieved on Apr. 6, 2009 at <<ftp://ftp.research.microsoft.com/pub/tr/tr-2002-21.pdf>>, IEEE Computer Society, Proceedings of Symposium on Security and Privacy (SP), 2002, pp. 1-10.

Dung, "Declarative Semantics of Hypothetical Logic Programming with Negation as Failure", Springer-Verlag, Proceedings of International Workshop on Extensions of Logic Programming, Bologna, IT, Feb. 1992, pp. 45-58.

Farkas, et al., "The Inference Problem: A Survey", retrieved on Apr. 6, 2009 at <<http://citeseerx.ist.psu.edu/viewdoc/download?doi=10.1.1.112.4025&rep=rep1&type=pdf>>, ACM, SIGKDD Explorations Newsletter, vol. 4, No. 2, Dec. 2002, pp. 6-11.

Flach (ed.), et al., "Abduction and Induction", Kluwer Academic Publishers, Dordrecht, 2000.

Focardi, et al., "A Classification of Security Properties for Process Algebras", retrieved on Apr. 6, 2009 at <<http://citeseerx.ist.psu.edu/viewdoc/download;jsessionid=849CE6B043CDB91E95BD53D6481C4F85?doi=10.1.1.35.3978&rep=rep1&type=pdf>>, IOS Press, Journal of Computer Security, vol. 3, No. 1, 1994, pp. 5-33.

Goguen, et al., "Security Policies and Security Models", retrieved on Apr. 6, 2009 at <<http://www.cs.ucsb.edu/~kemm/courses/cs177/noninter.pdf>>, IEEE Symposium on Security and Privacy, Oakland, CA, Apr. 1982, pp. 11-20.

Gurevich, et al., "DKAL 2—A Simplified and Improved Authorization Language", retrieved on Apr. 6, 2009 at <<http://research.microsoft.com/en-us/um/people/gurevich/opera/200.pdf>>, Microsoft Research, Microsoft Corporation, Technical Report, 2009, pp. 1-26.

Gurevich, et al., "DKAL: Distributed-Knowledge Authorization Language", retrieved on Apr. 6, 2009 at <<http://research.microsoft.com/en-us/um/people/gurevich/opera/191ea.pdf>>, Proceedings of IEEE Symposium on Computer Security Foundations (CSF-21), 2008, pp. 149-162.

Jajodia, et al., "Inference Problems in Multilevel Secure Database Management Systems", retrieved on Apr. 6, 2009 at <<http://www.acsac.org/secshelf/book001/24.pdf>>, IEEE Computer Society Press, Information Security: An Integrated Collection of Essays, 1995, pp. 570-584.

Jim, "SD3: a trust management system with certified evaluation", retrieved on Apr. 6, 2009 at <<http://citeseerx.ist.psu.edu/viewdoc/download?doi=10.1.1.86.8502&rep=rep1&type=pdf>>, IEEE Computer Society, Proceedings of Symposium on Security and Privacy, 2001, pp. 106-115.

Kakas, et al., "The Role of Abduction in Logic Programming", Handbook of Logic in Artificial Intelligence and Logic Programming, Oxford University, 1995, pp. 235-324.

Li, et al., "A Practically Implementable and Tractable Delegation Logic", retrieved on Apr. 6, 2009 at <<http://citeseerx.ist.psu.edu/viewdoc/download?doi=10.1.1.27.5431&rep=rep1&type=pdf>>, IEEE Computer Society, Symposium on Security and Privacy (SP), Oakland, CA, 2000, pp. 27-42.

Li, et al., "Datalog with Constraints: A Foundation for Trust Management Languages", retrieved on Apr. 6, 2009 at <<http://theory.stanford.edu/~ninghui/papers/cdatalog_padl03.pdf>>, Springer-Verlag London, London, Lecture Notes in Computer Science vol. 2562, Proceedings on International Symposium on Practical Aspects of Declarative Languages, 2003, pp. 58-73.

Li, et al., "Design of a Role-based Trust-management Framework", retrieved on Apr. 6, 2009 at <<http://theory.stanford.edu/~ninghui/papers/rt_oakland02.pdf>>, IEEE Computer Society, Proceedings of Symposium on Security and Privacy (SP), 2002, pp. 1-17.

Ryan, et al., "Opacity—Further Insights on an Information Flow Property", retrieved on Apr. 6, 2009 at <<http://www.cs.ncl.ac.uk/publications/trs/papers/958.pdf>>, University of Newcastle upon Tyne, Computing Science, Technical Report Series CS-TR-958, 2006, pp. 1-16.

(56) References Cited

OTHER PUBLICATIONS

Sabelfeld, et al., "Language-Based Information-Flow Security", IEEE Journal on Selected Areas in Communications, vol. 21, No. 1, Jan. 2003, pp. 1-15.

"SecPAL", retrieved on Apr. 7, 2010 at <<http://research.microsoft.com/en-us/projects/secpal/>>, Microsoft Research, Microsoft Corporation, 2010, pp. 1-2.

Ullman, "Implementation of Logical Query Languages for Databases", ACM, Transactions on Database Systems, vol. 10, No. 3, Sep. 1985, pp. 289-321.

Winsborough, et al., "Automated Trust Negotiation", retrieved on Apr. 6, 2009 at <<http://citeseerx.ist.psu.edu/viewdoc/download?doi=10.1.1.43.1018&rep=rep1&type=pdf>>, ACM, Proceedings of Conference on Computer and Communications Security, Alexandria, VA, 2005, pp. 46-57.

Winsborough, et al., "Safety in Automated Trust Negotiation", retrieved on Apr. 6, 2009 at <<http://reference.kfupm.edu.sa/content/a/u/automated_trust_negotiation_57698.pdf>>, ACM Transactions on Information and System Security, vol. 9, No. 3, Aug. 2006, pp. 352-390.

Zdancewic, et al., "Robust Declassification", IEEE Computer Society, Proceedings of Computer Security Foundations Workshop, 2001, pp. 15-23.

* cited by examiner

DELEGATION-BASED AUTHORIZATION

BACKGROUND

Authorization policies are used to control access to security-critical services in distributed environments such as computer networks. Such authorization policies can be defined using associated authorization languages, which provide flexibility and expressiveness in the policy specification. These languages allow the authorization policy to be written explicitly as a list of declarative rules.

Requests for access to security-critical services are received at a reference monitor, which is a service serving requests from user terminals. The reference monitor queries an authorization node executing the authorization policy. Access for the user is granted only if the authorization node evaluating the policy succeeds in proving that the request complies with the local policy.

As authorization languages become more expressive, the risk of attack through complex, carefully formulated requests increases. For example, credential-based (also called "claims-based") policy languages for authentication/authorization are becoming increasingly widely used. Such languages subscribe to what is known as the trust management principle: authorization decisions are based on the local policy in union with a (potentially empty) set of supporting credentials (containing assertions) submitted by the requester. Access requests are mapped to queries, so that access is granted if the corresponding query succeeds when evaluated in the context of the policy and the submitted credentials.

If the supporting credentials exceed a certain level of expressiveness, it becomes possible for attackers to infer knowledge about secret facts stored in the local policy, just by submitting credentials and observing the response to a legitimate query. Such attacks are possible when credentials contain statements that are conditioned on the existence of credentials issued by other entities.

Some authorization languages do not allow submitted credentials to contain any conditions, and thus avoid this type of attack. However, this restriction on expressiveness of the authorization language is too high a price to pay in general.

The embodiments described below are not limited to implementations which solve any or all of the disadvantages of known authorization languages and systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Delegation-based authorization is described. In one example, a reference monitor receives from a first entity a request and a credential statement comprising a delegation of authority over a fact to a further entity. An authorization node then determines whether the further entity consents to provide the fact to the first entity and evaluates the request in accordance with an authorization policy and the credential statement. In another example, an assertion comprising a statement delegating authority over a fact to a further entity is received at an authorization node from a first entity. An authorization policy is then used to determine that the first entity vouches for the fact if each of these conditions are met: i) the first entity consents to import the fact from the further entity, ii) the further entity consents to export the fact to the first entity, and iii) the further entity asserts the fact.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an authorization system using the SecPAL authorization language, the system described is provided as an example and not a limitation. As those skilled in the art will appreciate, the present examples are suitable for application in a variety of different types of authorization systems using different authorization languages.

Expressive credential-based authorization languages enable the use of delegation of authority. Delegation of authority is a useful way of enabling a first entity (or "principal") to vouch for certain facts in an authorization system on the basis that the first entity trusts a further entity, and the further entity has asserted the fact.

For example, consider the illustrative scenario of a university bookstore (called "A") that only sells books to students. The fact (called "F") in this example is whether a person ("X") is a student. The bookstore A does not have direct access to the university records of who is, or is not, a student. However, the university (called "B") does have access to these records, and the bookstore A trusts the university B. The bookstore A can therefore delegate authority over the fact F (X is a student) to the university B. In other words, the bookstore A is willing to "say" (or vouch for) the fact (X is a student) if the university B says the fact F. Therefore, the bookstore A is the delegator, and the university B is the delegatee.

This intention can be encoded as a delegation assertion, or a credential (which is just an assertion that can be communicated between principals). The effect of this delegation assertion is as follows. If A (or the system, depending on the language) can deduce that B indeed says F, for example because a credential to this effect can be found, then A also says F. The latter utterance can then be used to potentially deduce other utterances.

This can be expressed more formally as:

$$\frac{A \text{ delegates authority over } F \text{ to } B \quad B \text{ says } F}{A \text{ says } F} \quad (I)$$

Wherein everything above the line in statement (I) is a premise, and what is below the line is a conclusion. This can therefore be considered to state that if A delegates authority over F to B, and B says F, then A says F.

Delegation of authority is therefore a useful feature in authorization languages, and provides valuable expressiveness. However, when authorization languages are expressive enough to use delegation of authority, and are able to submit delegation of authority assertions as credentials, then the languages can be used by attackers to infer secrets from within authorization policies.

The type of attack in question is called a probing attack, and can be illustrated with a hypothetical example. Imagine a "Service" (for example run at a government agency) with a policy that gives parking permissions to principals that consent to the relevant terms and conditions. The Service can therefore be legitimately used by principals to request permission to park in a car park. However, the policy additionally contains other confidential facts unrelated to parking that are used by other services. For example, the policy can also hold the identities of secret agents (e.g. working at the government agency).

An adversary, called Alice, submits a request for a parking permission to the Service, and together with the request submits two self-issued credentials containing the following assertions to the Service:

(1) Alice says Alice consents to parking rules if Bob is a secret agent
(2) Alice says Service can say Bob is a secret agent The second credential (Alice says Service can say Bob is a secret agent) is a delegation of authority assertion, which delegates the assertion of the fact (whether Bob is a secret agent) to the Service. This is written here in the authorization language SecPAL (which uses "can say" statements) which is discussed in more detail hereinafter.

If the access request, corresponding to a query of the form <Service says Alice can park>, succeeds, then Alice could infer from this observation that Service says Bob is a secret agent. This fact, together with credential (2), implies that Alice also says that Bob is a secret agent, hence the condition of (1) would be satisfied and Alice's parking consent is valid, which in turn makes the query succeed.

However, a closer look reveals that the secret agent fact cannot be inferred with certainty, as there are two alternative valid explanations that would lead to the same observation: Service says Alice can park, and Service says Alice consents to parking rules. However, the attack can be made more precise by Alice conducting a second probe, again with the same request (and thus the same query), but submitting only the first of the two credentials above. If this second probe yields a negative response, Alice can be certain that Bob is indeed a secret agent (according to Service), for then she knows that (2) is essential in making the query succeed.

A similar attack can be mounted in order to check for the absence of any secret agent fact. Clearly, it is highly undesirable for the adversary Alice to find out if Bob is a secret agent just by requesting a parking permission.

Such attacks make it possible for attackers to infer knowledge about secret facts stored in a local policy, just by submitting credentials (probes) and observing the response to a legitimate query, even though the query has nothing to do with the fact. Successive probing through credentials effectively provides a covert channel for confidential facts, and this type of attack works with a wide range of modern policy systems.

In general, such attacks work in trust management environments because services have policies, parts of which may be confidential. Policies can be queried by external principals (though not all queries may be available to all principals). Principals can submit credentials to support the query, and the query is evaluated against the local policy in union with the set of submitted credentials. If policy language is expressive enough to support delegation of authority, and credentials can contain such assertions, then these can be manipulated to infer the confidential facts as demonstrated above.

The underlying problem is an asymmetry in the way delegation of authority works. In a delegation statement, the delegator consents to import statements from the delegatee, but the delegatee does not need to consent to exporting the statements. Therefore, an adversary can abuse this mechanism by "importing" secret facts from the delegatee without his consent.

This is solved by restoring symmetry in the way delegation works: the delegator consents to importing facts from the delegatee, and the delegatee consents to exporting facts to the delegator. To achieve this, the delegation mechanisms of authorization policy languages are modified, as described in more detail hereinafter.

Figure 1:
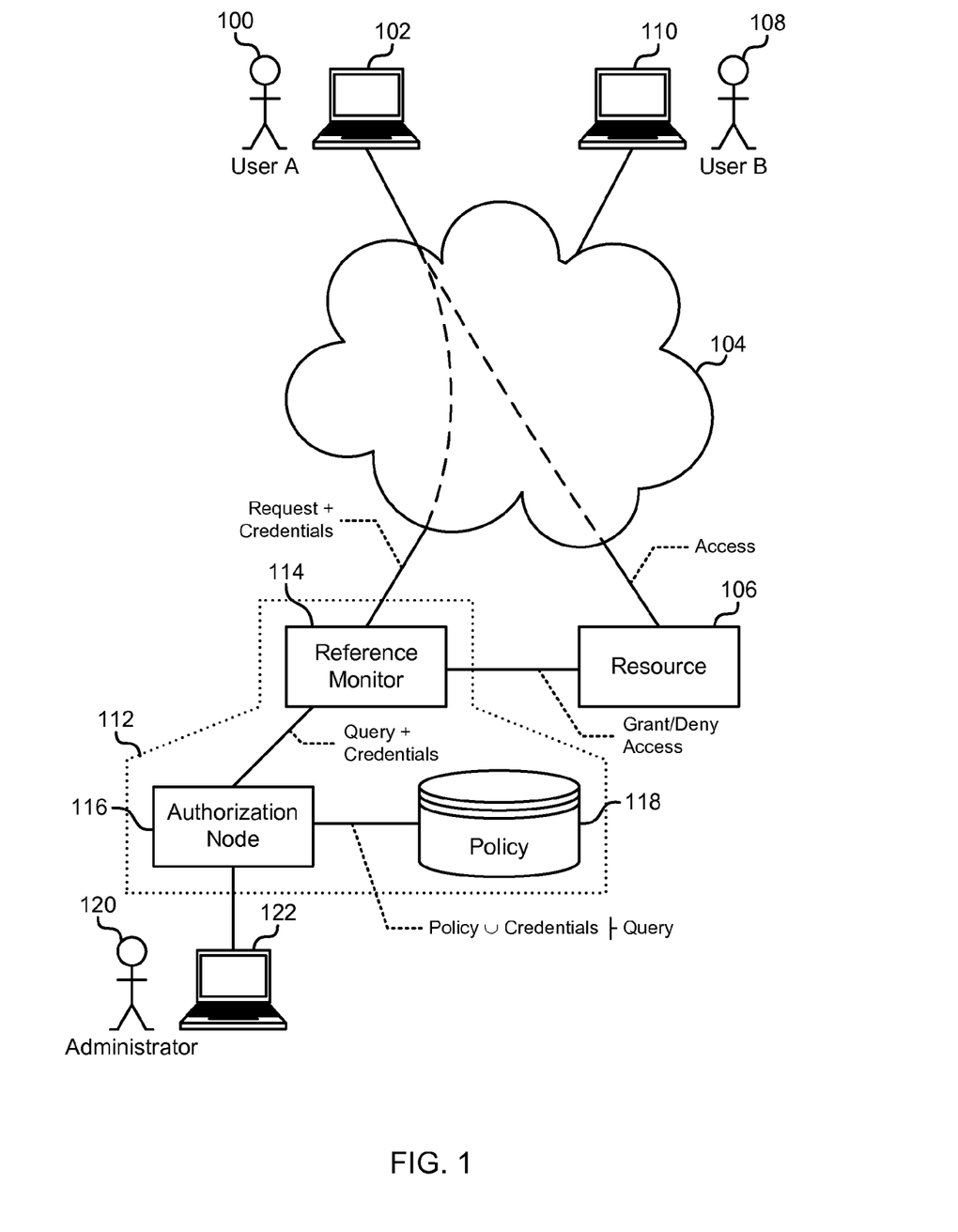
FIG. 1 illustrates a schematic diagram of an authorization system.

Reference is now made to FIG. 1, which illustrates an authorization system in which delegation of authority can be used, and probing attacks mitigated. In normal use, the system is used to provide one or more entities with access to a secured resource. In the example of FIG. 1, a first entity 100 ("User A") operates a first user terminal 102 connected to a communication network 104. The communication network 104 can comprise, for example, a wide area network such as the interne, or a local area network. The first entity 100 wishes to gain access to a resource 106 connected to the communication network 104. However, the resource 106 is secured such that the first entity 100 is authorized before being able to access the resource 106. The resource 106 can be, for example, a document stored on a server, data stored in a database, a webpage, physical access to a building or place, an executable program, processing resources or another communication network.

FIG. 1 also shows a second entity 108 ("User B") operating a second user terminal 110 connected to the communication network 104. The second entity 108 can also request access to the secured resource 106. Note that whilst FIG. 1 only illustrates two entities, any number of entities can be connected to the communication network 104 and request access to the secured resource 106.

Authorization to access the resource 106 is provided by an authorization system 112. The authorization system 112 comprises a reference monitor 114, an authorization node 116 (also known as a policy engine) and an authorization policy 118.

The reference monitor 114 is connected to the communication network 104. The reference monitor 114 is a service arranged to serve access requests from the user terminals over the communication network 104. In other words, the reference monitor 114 operates as a front-end to the authorization system 112 and mediates the requests from the entities for access to the resource 106.

The authorization node 116 is connected to the reference monitor 114. The authorization node 116 is executing (or in communication with) an authorization policy 118. The authorization policy 118 comprises a list of rules for determining whether to grant an entity access to the resource 106, and under what conditions. The authorization policy 118 is defined using an authorization query language, such as Sec-PAL as described in more detail hereinafter. The authorization policy 118 is defined and maintained by an administrator 120 operating an administration terminal 122 that can communicate with the authorization node 116 (directly or via the communication network 104).

Note that the reference monitor 114, authorization node 116 and the authorization policy 118 can be implemented on physically separate network elements. Alternatively, they can be implemented on common network elements (e.g. all on the authorization node 116). However, the reference monitor 114 and the authorization node 116 are separate functional elements, and can be implemented in differing programming languages. Note that, in alternative examples, the first entity 100 can be directly interacting with the hardware that is executing the reference monitor 114, in which case network 104 and user terminal 102 need not be present.

Figure 2:
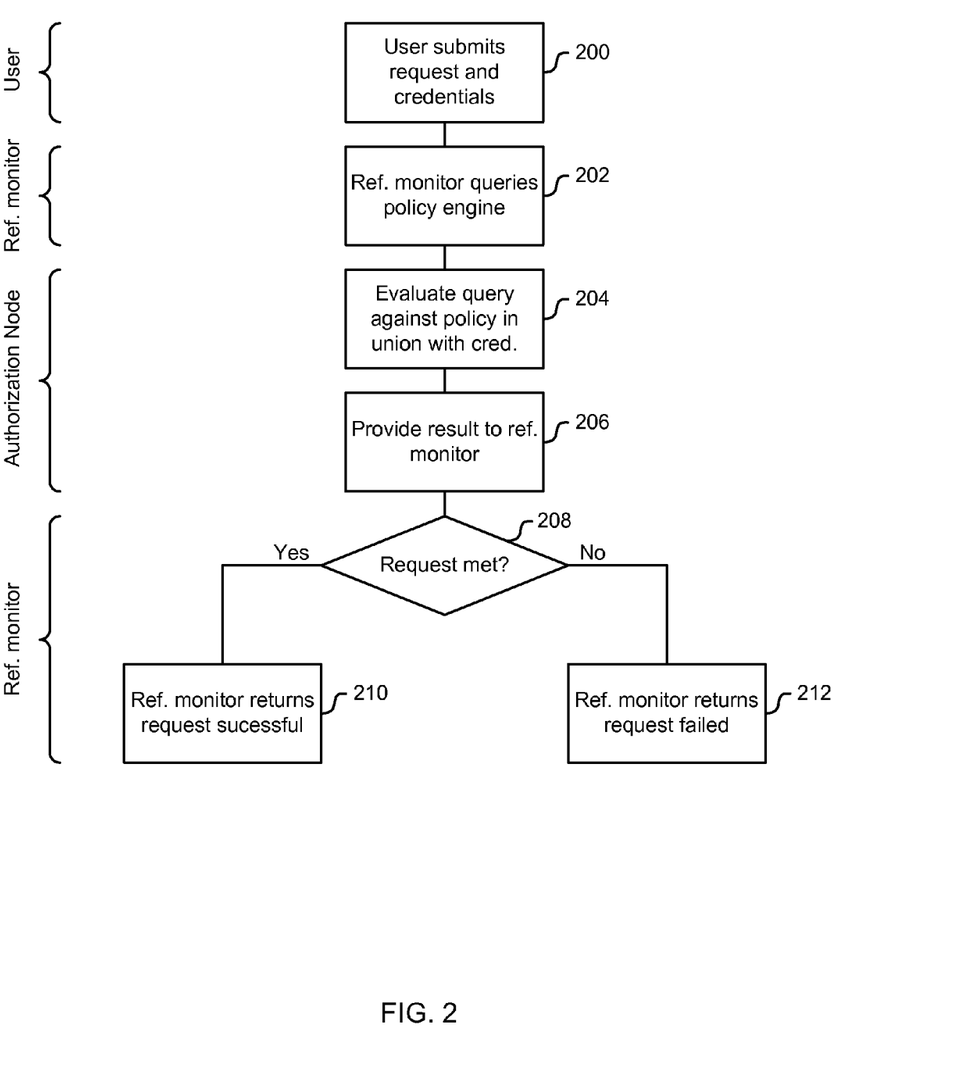
FIG. 2 illustrates a flowchart of a process for evaluating a request and supporting credentials.

Reference is now made to FIG. 2, which illustrates a flowchart of a process for evaluating a request and supporting credentials in the system of FIG. 1. If the first entity 100 is using the system legitimately (i.e. not for a probing attack), then the first entity 100 requests access to the resource 106 by using the user terminal 102 to submit 200 a request message to the reference monitor 114. The request can also be accompanied by legitimate supporting credentials, which can optionally comprise delegation of authority assertions. Responsive to receiving the request message, the reference monitor 114 formulates a query 202, and sends the query and the supporting credentials to the authorization node 116 to ask whether the first entity 100 is to be granted access. The query to the authorization node 116 can comprise data regarding the requested resource, the type of action that the user wishes to perform on the resource, the requesting entity and/or the user terminal.

The authorization node 116 evaluates 204 the query in accordance with the authorization policy 118 and the supporting credentials. The authorization policy 118 comprises one or more rules which are evaluated in light of the query and the credentials to determine whether to authorize the user. To do this, the query is evaluated against the authorization policy 118 in union with the supporting credentials. More formally, the authorization node evaluates:

$$P \cup C Q$$

Where: P is the policy, C is the set of credentials, and Q is the query.

As part of this evaluation, any delegation of authority is evaluated. This is evaluated using a mechanism similar to that shown in statement (I) above. This is outlined in greater detail hereinafter.

The result of the evaluation of the query is provided 206 to the reference monitor 114 by the authorization node 116. The reference monitor 114 then determines 208 from the result whether the request was met. If so, the reference monitor returns 210 a request successful message to the first entity 100 and can then grant access to the resource 106 for the first entity 100. Alternatively, if the request was not met, the reference monitor returns 212 a request failed message to the first entity 100 and denies access to the resource 106 for the first entity 100.

If the first entity 100 is not a legitimate user of the system, but is an attacker, then the first entity 100 can utilize the process of FIG. 2 to submit requests for access to the resource 106, even though he has no interest in accessing the resource 106. Instead, the first entity 100 wants to use the returned results infer secret facts from within the policy 118 that are unrelated to the resource 106.

To do this, the first entity 100 again submits a request for access to the resource 106 along with supporting credentials. The supporting credentials contain assertions that are selected to enable the inference of facts from the policy. At least one of these assertions is a delegation of authority. Such statements delegate the authority over a fact to a further entity, such as the second entity 108 or the authorization node 116.

The request and supporting credentials are converted to a query by the reference monitor 114, as before, and provided to the authorization node 116. The authorization node 116 evaluates the query as if it were legitimate, by evaluating it against the authorization policy 118 in union with the supporting credentials containing the delegation of authority assertions. The result is provided back to the first entity 100 via the reference monitor 114. The first entity 100 then uses the result to infer facts from the policy, or generates new requests that can be sent to reference monitor 114 to combine with the results and infer facts.

As mentioned, such attacks work because of the asymmetry in the manner in which delegation of authority is evaluated. The asymmetry arises because current delegation mechanisms are of the form shown in statement (I) above, which is a two-stage mechanism: i) the delegator consents to import statements from the delegatee ("A delegates authority over F to B"); and ii) the assertion of the actual fact made by the delegatee ("B says F").

Many existing policy languages implement a delegation mechanism of this type. For example, the SecPAL language has two delegation of authority rules. The first rule uses a "can say" verb for delegation, as follows:

---
Policy A says B can say F
Policy B says F
Policy A says F

---

This operates in the same manner as the previous, generic example in statement (I) and is a two-stage mechanism: i) the delegator consents to import statements from the delegatee ("A says B can say F"); and ii) the assertion of the actual fact made by the delegatee ("B says F").

The second rule operates in a similar manner, except that the further delegation of the fact is not permitted. This second rule uses a "can say$_0$" verb as follows, but otherwise operates in the same way as described above:

---
Policy A says B can say$_0$ F
{Assertions in Policy said by B} B says F
Policy A says F

---

In many other policy languages (other than SecPAL described above), delegation is expressed as follows:

$A$ says $F$ if $B$ says $F$

This corresponds to "A says B can say F" in SecPAL. The precise syntax can vary, for example this can be expressed as:

$$A \cdot F \leftarrow B \cdot F$$

Nevertheless, regardless of the form of expression, it can be seen that in each of these cases the delegatee does not need to consent to exporting the facts. Therefore, an adversary can abuse this mechanism by "importing" secret facts from the delegatee without his consent. Hence, in FIG. 2 above, the delegation of authority is evaluated using statement (I) when determining the outcome of the query (which was unrelated to the secret facts) without the delegatee consenting to the facts being used in this way.

To address this, a new delegation of authority mechanism is implemented, which uses three assertions to make delegation happen: firstly, an assertion made by the delegator consenting to import facts from the delegatee; secondly, an assertion made by the delegatee consenting to export facts to the delegator; thirdly, the assertion of the actual fact made by the delegatee. As a result, the delegator vouches for the same fact. This can be expressed as:

```
A delegates authority over F to B
B consents to saying F to A
B says F
A says F
```

This can therefore be considered to state that if A delegates authority over F to B, and B consents to saying F to A, and B says F, then A says F. This restores symmetry in the way delegation works: the delegator consents to importing facts from the delegatee, and the delegatee consents to exporting facts to the delegator.

As a result of this three-stage delegation mechanism, the manner in which the query is evaluated in FIG. 2 above is modified. This is illustrated in more detail in FIG. 3, which shows a flowchart of a three-stage process for evaluating delegation of authority. The flowchart of FIG. 3 therefore modifies the block at which the query is evaluated 204 in FIG. 2. More formally, the H relation in the expression P∪C Q is modified to include the symmetric rules for evaluating delegation of authority.

Figure 3:
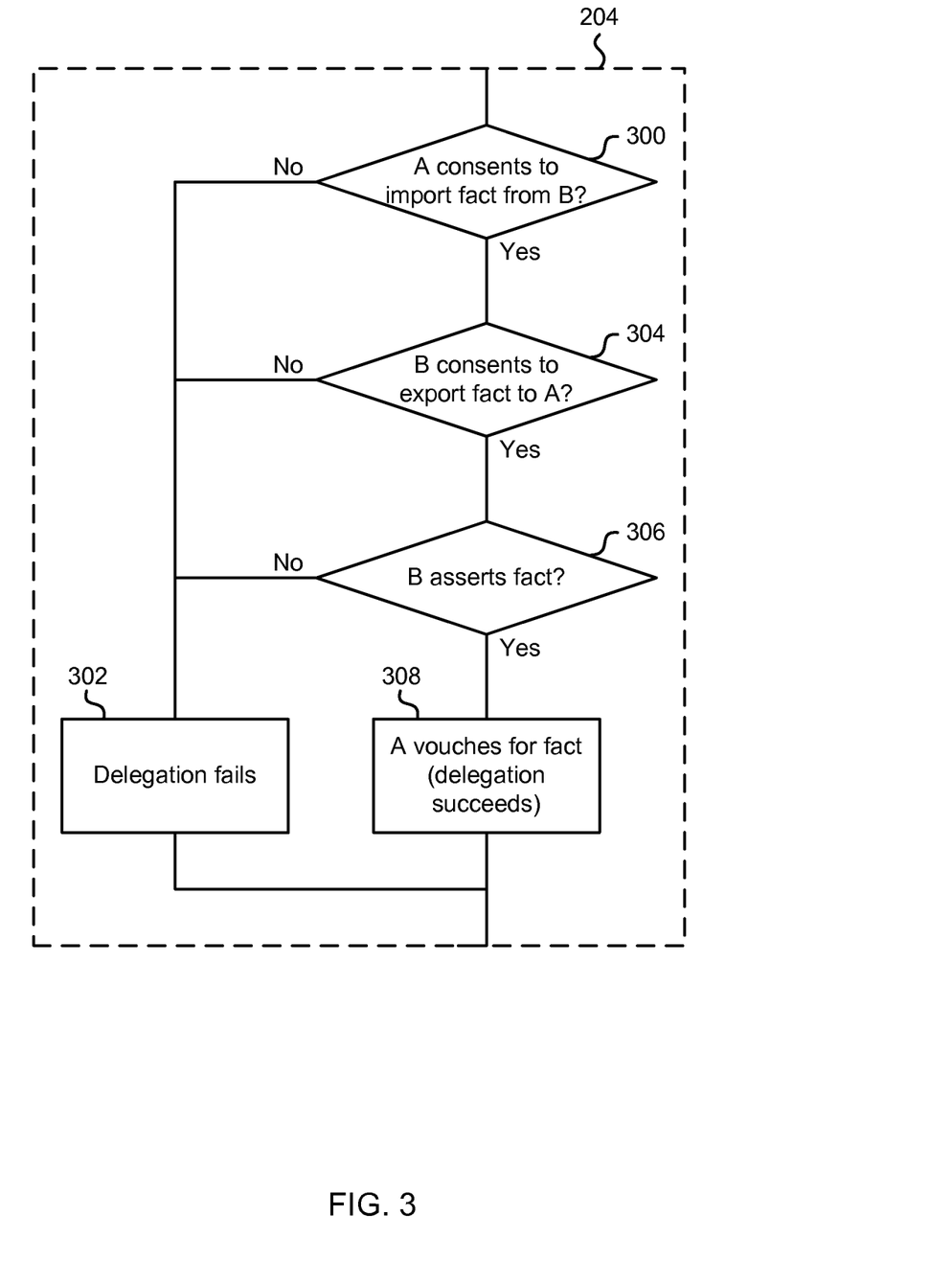
FIG. 3 illustrates a flowchart of a process for evaluating a delegation of authority statement.

Firstly, it is determined 300 whether A (e.g. the first entity 100) consents to import the fact from B (e.g. some further entity). If A is an attacker attempting a probing attack, then A wants to consent to this and meet this condition. If, however, the condition is not met, then the delegation fails 302.

Secondly, if A does consent to import the fact from B, then it is determined 304 whether B consents to export that fact to A. This is the additional stage that restores the symmetry to the delegation, and prevents probing attacks. If B does not consent to export the fact, then the delegation fails 302.

Thirdly, if B does consent to export the fact to A, then it is determined 306 whether B asserts the fact. If so, then the delegation was successful, and A vouches 308 for the fact. If not, then the delegation fails 302.

The process of FIG. 3 prevents probing attacks because the delegation in such attacks fails, due to the lack of consent to export the fact to the attacker. Therefore, because the delegation assertion fails, this cannot have any effect on the result of the request from the attacker. Hence, the attacker cannot use the delegation assertion to import facts from unrelated parts of the policy, and cannot compare the results with other requests that do not use delegation to infer secret facts. Note that the order in which the conditions in FIG. 3 are evaluated can be changed without changing the result.

The above-described modified delegation of authority mechanism is implemented for the policy language SecPAL by introducing a "can listen to" verb phrase, as shown below:

```
Policy A says B can say F
Policy B says A can listen to F
Policy B says F
Policy A says F
```

The "can listen to" verb phrase implements the consent of B to export the fact to A. Similarly, for the "can say$_0$" delegation rule, the "can listen to" verb phrase is introduced, as shown below:

```
Policy A says B can say₀ F
{Assertions in Policy said by B} B says A can listen to F
{Assertions in Policy said by B} B says F
Policy A says F
```

For other authorization languages a similar modified delegation of authority mechanism can be introduced to protect against probing attacks. For example, in the case of other policy languages in which delegation is expressed in the form "A says F if B says F" (or similar), then an extra if-condition can be injected into the assertion, either before or after the original condition. This then gives the following:

A says F if
B says export(F,A),
B says F.

Here, "B says export(F,A)" corresponds to "B says A can listen to F" as described above.

The insertion of the additional condition into any of the above-described delegation statements can be performed either statically or dynamically at runtime, and at any layer of the runtime system. In some examples, the insertion can be performed automatically by the reference monitor 114 or the authorization node 116 whenever the presence of a delegation of authority assertion is detected.

With the above-described modification, the following security guarantee is obtained: for all principals A and B and service S: if the adversary A cannot view S's policy directly and cannot evaluate queries involving the atomic assertion "B says F" against S's policy, and if the adversary A neither possesses nor is able to create assertions that are issued by B that involve F, then the adversary A cannot infer with certainty whether the atomic assertion "B says F" is true or false in S's policy, unless "B says A can listen to F" is derivable.

Figure 4:
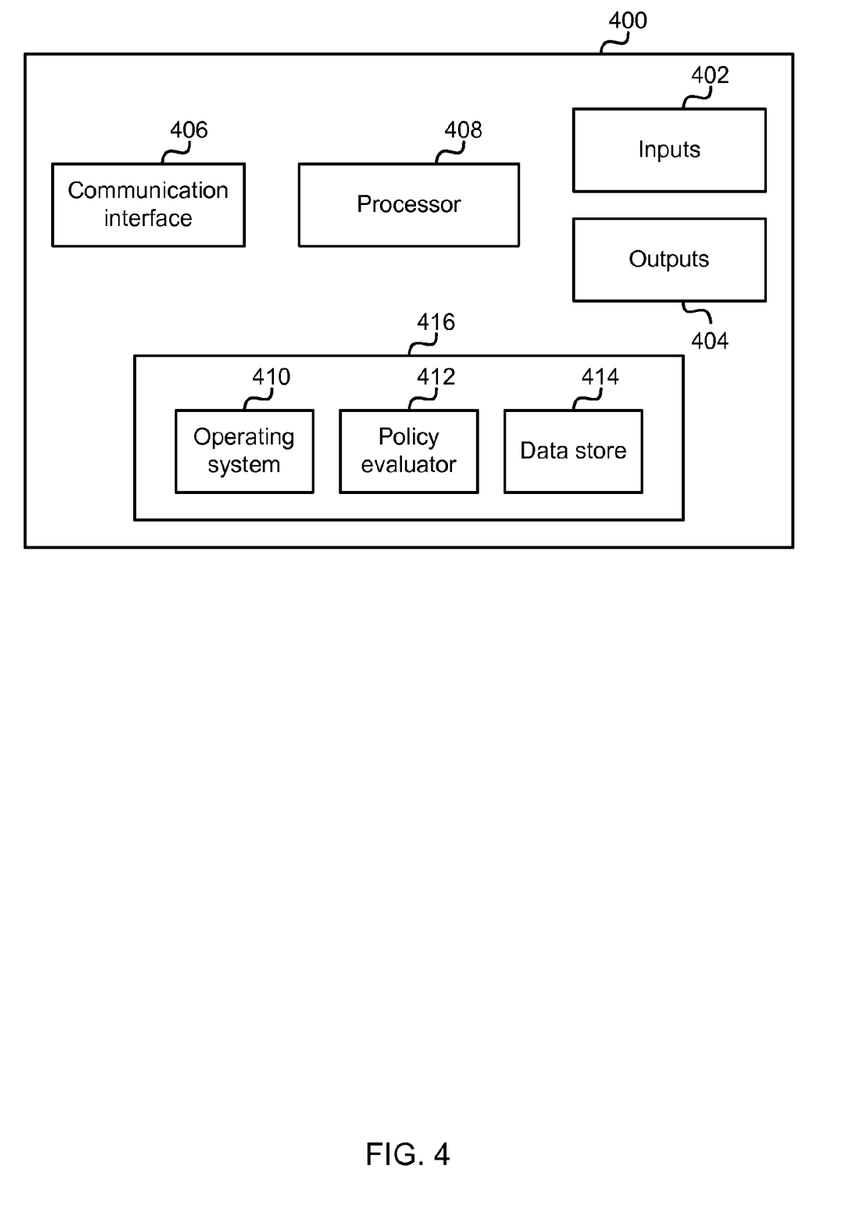
FIG. 4 illustrates an exemplary computing-based device in which embodiments of the delegation-based authorization may be implemented.

Reference is now made to FIG. 4, which illustrates various components of an exemplary computing-based device 400 which can be implemented as any form of a computing and/or electronic device, and in which embodiments of the delegation-based authorization can be implemented. The exemplary computing-based device 400 can for example implement the authorization node 116.

The computing-based device 400 comprises one or more inputs 402 which are of any suitable type for receiving input such as from the administrator terminal 122. An output 404 is also provided such as data and/or video output to the administrator terminal in communication with the computing-based device. The output can provide a graphical user interface, or other user interface of any suitable type although this is not essential. The device also comprises communication interface 406 suitable for communicating with other elements of the authorization system, such as the reference monitor and authorization state database.

Computing-based device 400 also comprises one or more processors 408 which can be microprocessors, controllers or any other suitable type of processors for processing computing executable instructions to control the operation of the device in order to evaluate the authorization policy. Platform software comprising an operating system 410 or any other suitable platform software can be provided at the computing-based device 400 to enable policy evaluator software 412 to be executed on the device. The policy evaluator software 412 can comprise delegation assertion evaluation logic for inserting the above-described conditions into a delegation assertion, and determining the result of the modified delegation assertion. A data store 414 can be provided to store the authorization policy, and other data such as intermediate results.

The computer executable instructions can be provided using any computer-readable media that is accessible by computing based device 400. Computer-readable media can include, for example, computer storage media such as memory 416 and communications media. Computer storage media, such as memory 416, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 416) is shown within the computing-based device 400 it will be appreciated that the storage may be distributed or located remotely and accessed via a network or other communication link (e.g. using communication interface 406).

The term "computer" is used herein to refer to any device with processing capability such that it can execute instructions. Those skilled in the art will realize that such processing capabilities are incorporated into many different devices and therefore the term "computer" includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to "an" item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term "comprising" is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An authorization system, comprising:
one or more hardware processors configured to provide an authorization node executing an authorization policy; and
a reference monitor arranged to receive from a first entity a request for access to a resource and a credential statement, wherein the first entity consents to import a fact from a further entity, wherein the authorization node is arranged to determine whether the further entity consents to export the fact to the first entity, and, responsive thereto, evaluate the request for access in accordance with the authorization policy and the credential statement, the authorization node being further arranged to deny the access request received from the first entity in response to the further entity not consenting to export the fact to the first entity, wherein the request and credential statement are SecPAL statements, and the delegation of authority in the credential statement comprises a "can say" statement, and the further entity consents to provide the fact to the first entity using a SecPAL "can listen to" statement.

2. A system according to claim 1, wherein if the further entity consents to provide the fact to the first entity, then the delegation succeeds and the credential statement imports the fact from the further entity.

3. A system according to claim 1, wherein if the further entity does not consent to provide the fact to the first entity, then the delegation fails and the credential statement does not import the fact from the further entity.

4. A system according to claim 1, wherein the authorization node is arranged to provide an evaluation result to the reference monitor.

5. A system according to claim 4, wherein the reference monitor is further arranged to grant or deny the first entity access to the resource in dependence on the evaluation result.

6. A system according to claim 1, wherein the reference monitor is further arranged to detect the presence of the delegation of authority and insert an additional condition requiring that the further entity consents to provide the fact to the first entity into the delegation of authority.

7. A system according to claim 1, wherein the authorization node is arranged to evaluate the request for access by determining the union of the authorization policy and the credential statement.

8. A system according to claim 1, wherein the reference monitor receives the request for access and credential statement from a first entity over a communication network.

9. A system according to claim 1, wherein the reference monitor is further arranged to formulate a query from the request, and provide the query and the credential statement to the authorization node.

10. A system according to claim 1, wherein the credential statement is provided by the first entity in support of the request.

11. A computer-implemented authorization method performed at an authorization node executing an authorization policy, comprising:
   receiving, by a hardware processor, an assertion from a first entity comprising a credential statement, wherein the first entity consents to import a fact from a further entity; and
   using the authorization policy, the authorization policy being a SecPAL policy, to evaluate the assertion, the assertion being validated in the case that each of the following are met:
      i) the first entity consents to import the fact from the further entity, consent comprising a SecPAL "can say" statement;
      ii) the further entity consents to export the fact to the first entity, consent comprising a SecPAL "can listen to" statement; and
      iii) the further entity asserts the fact.

12. A method according to claim 11, further comprising the step of, subsequent to receiving the assertion, detecting the credential statement delegating authority and automatically inserting condition ii) into the statement delegating authority.

13. A method according to claim 11, further comprising the step of using the authorization policy to determine that the first entity cannot vouch for the fact in the case that either one or both of condition i) and ii) are not met.

14. A method according to claim 11, further comprising the step of receiving a query in association with the assertion.

15. A method according to claim 14, further comprising the step of evaluating the query in accordance with the authorization policy and the assertion to determine a result.

16. A method according to claim 15, further comprising the step of using the result to grant or deny the first entity access to a resource.

17. A computer-implemented authorization method performed at an authorization node executing an authorization policy, comprising:
   receiving an authorization query and a supporting credential from a first entity, the query and credential statements being SecPAL statements, wherein the first entity consents to import a fact from a further entity;
   detecting, using a hardware processor, the presence of the delegation statement and inserting an additional condition into the delegation statement to create a modified delegation statement which states that the first entity consents to import a fact if the further entity consents to export the fact to the first entity, the delegation of authority in the credential statement comprising a "can say" statement, and the further entity consenting to provide the fact to the first entity using a SecPAL "can listen to" statement;
   evaluating the query, using the hardware processor, against the authorization policy in union with the modified delegation statement, the query being denied if the further entity does not consent to export the fact; and
   returning the result of the query to the first entity via a communication network.

18. A method according to claim 17, wherein the hardware processor is arranged to receive the authorization query and supporting credential from a reference monitor.

19. A method according to claim 18, wherein the reference monitor receives a request for access and credential statement from the first entity over a communication network.

20. A method according to claim 19, wherein the reference monitor is arranged to formulate the query from the request, and provide the query and the credential statement to the hardware processor.

* * * * *